United States Patent [19]

Sumida

[11] Patent Number: 5,585,781
[45] Date of Patent: Dec. 17, 1996

[54] ELECTRIC CURRENT CONTROL CIRCUIT FOR SWITCHES

[75] Inventor: Yoshitaka Sumida, Yokkaichi, Japan

[73] Assignee: Sumitomo Wiring Systems, Ltd., Japan

[21] Appl. No.: 516,289

[22] Filed: Aug. 17, 1995

[30]  Foreign Application Priority Data

Aug. 19, 1994  [JP]  Japan ................................. 6-195587

[51] Int. Cl.⁶ .................................................. B60Q 1/100
[52] U.S. Cl. .......................................... 340/459; 340/455
[58] Field of Search .................................. 340/426, 518, 340/519, 517, 521, 510, 458, 459, 455

[56]  References Cited

U.S. PATENT DOCUMENTS

| | | | |
|---|---|---|---|
| 4,401,971 | 8/1983 | Saito et al. | 340/519 |
| 4,441,100 | 4/1984 | Galloway | 340/510 |
| 4,817,040 | 3/1989 | Bodley-Scott | 340/459 |
| 4,866,390 | 9/1989 | Butchko | 340/458 |
| 4,965,550 | 10/1990 | Wroblewski | 340/518 |
| 5,121,112 | 6/1992 | Nakadozono | 340/459 |
| 5,235,317 | 8/1993 | Sutterlin et al. | 340/458 |
| 5,307,048 | 4/1994 | Sonders | 340/426 |
| 5,325,082 | 6/1994 | Rodriguez | 340/521 |
| 5,357,560 | 10/1994 | Nykerk | 340/426 |
| 5,373,281 | 12/1994 | Andersen et al. | 340/459 |
| 5,387,897 | 2/1995 | Bechtle et al. | 340/426 |

FOREIGN PATENT DOCUMENTS 4-152795  6/1992  Japan .

Primary Examiner—Jeffery Hofsass
Assistant Examiner—Timothy Edwards, Jr.
Attorney, Agent, or Firm—Anthony J. Casella; Gerald E. Hespos

[57]  ABSTRACT

In a device for detecting the operative states of switches, a common switching device 17 is connected in series with input resistors 16, and currents flowing into switching circuits are cut off when it is judged based on the states of switches 10 to 15 that a vehicle is being parked. Further, a detector 19 is so set as to perform its detection only at specified intervals. The switching device 17 is turned on at the detection timing of the detector 19 and is, when the detector 19 performs no detection, turned off so as to prevent the currents from flowing into the respective switching circuits. With the above construction, the currents flowing into the switching circuits can perfectly be cut off while the vehicle is being parked, and the input resistors in use are less than in the prior art. Further, since the currents flow through the input resistors at specified intervals, an average power consumption of each input resistor can be reduced, enabling the use of input resistors having a low rated power.

20 Claims, 5 Drawing Sheets

ELECTRIC CURRENT CONTROL CIRCUIT FOR SWITCHES

FIELD OF THE INVENTION

The present invention relates to a circuit for detecting the operative states of switches provided in an automotive vehicle and controlling a current flowing into each switch if necessary.

DESCRIPTION OF THE PRIOR ART

A prior art device for detecting the operative states of switches provided in an automotive vehicle is shown in FIG. 5. This device is provided with an ignition switch 10, switching circuits, a detector 19 for detecting the states of switches 10 to 15, and a controller 22 for controlling the operation of loads 21 such as a warning buzzer and a door lock motor in accordance with an output signal of the detector 19. The switching circuits include each one of the following switches provided in the automotive vehicle: a door open switch 11, an ignition key switch 12, a door lock switch 13, a door lock release switch 14 and a door lock motor position detection switch 15, and input resistors 16 connected in series with the corresponding switches. A resistor 20 is an input protection resistor in each circuit.

The above detecting device operates as follows. In a normal state, for example, the detector 19 detects the states of the ignition switch 10, the door open switch 11 and ignition key switch 12. When the ignition key is left in a key hole, i.e., when the ignition switch 10 is off, the door open switch 11 is on (the door is open), and the ignition key switch 12 is on (the ignition key is left in the key hole), the controller 22 operates the warning buzzer as one of the loads 21, thereby notifying a driver, who is maybe going to leave the vehicle, that the ignition key is left in the key hole. The detector 19 also detects the states of the door lock switch 13, the door lock release switch 14 and the door lock motor position detection switch 15. When the door lock switch 13 is on and the door lock motor position detection switch 15 is on (the door is unlocked), or when the door lock release switch 14 is on and the door lock motor position detection switch 15 is off (the door is locked), the controller 22 operates a door lock motor as one of the loads 21 to lock or unlock the door.

However, with the above detecting device, the following problem may arise. When an owner of an automotive vehicle parks in his own garage or other place with the doors unlocked or with the ignition key left in the key hole, since the door lock motor position detection switch 15 or the ignition key switch 12 is on, a current continues to flow into the switching circuit corresponding to the switch, thereby causing a battery to die.

In order to cope with the above problem, the art disclosed in Japanese Unexamined Patent Publication No. 4-152795 was developed. This art is such that, when it is judged based on the states of the respective switches that an automotive vehicle is being parked, an increasing means increases a resistance value of an input resistor so as to reduce a current flowing into each switching circuit.

However, the electric current control circuit for switches of this type cannot perfectly cut off the currents flowing into the respective switching circuits since the currents are only reduced by increasing the resistance value of the input resistors by means of the increasing means. Further, the use of a plurality of input resistors for one switching circuit leads to the problems of a large space taken up by the electric current control circuit on a printed circuit board and a higher production cost.

In view of the above problems, an object of the present invention is to perfectly cut off a dark current or zero signal current flowing into switches, to reduce the space taken up by input resistors on a printed circuit board and to reduce a production cost by reducing the number of the input resistors.

SUMMARY OF THE INVENTION

By means of the circuitry of the inventive control circuit, it is easily possible to perfectly cut off the flow of current into the switching circuits whenever a certain condition is met, e.g., when it is judged based on the states of the respective switches that the vehicle is being parked. Further, the number of input resistors can be reduced.

Preferably, the start switch which is provided in the automotive vehicle is connected with the detector means for detecting the state thereof so that the state of the start switch is taken into account when controlling the common switching device.

According to the preferred embodiment, the switching circuits are connected with the common switching device by means of input resistors. If the common switching device is connected to a power supply (e.g., battery of the automotive vehicle) and if the switches are grounded, these input resistors are particularly useful to avoid a short-circuit.

Preferably, the common switching device comprises a switching transistor, the base of which being connected with the controller means.

According to the preferred embodiment, the common switching device is turned off when the vehicle is being parked. Hence, it can be perfectly avoided that the battery of the automotive vehicle dies when the owner of the vehicle parks with the door unlocked or with the ignition key left in the key hole.

Finally, it is particularly preferred that the controller means causes the detector means to perform the detection of the states of the switches at specified intervals during which the common switching device is switched on, whereas the switching device is turned off while the detector means does not perform the detection. Advantageously, the common switching device is only switched on during the reading of the detector means. Preferably, the detector means is provided with a reading speed of 5 msec. or less, preferably less than 1 msec. and, accordingly, the common switching device is periodically switched on for 5 msec. or less, preferably less than 1 msec. Again preferably, the detector means is provided with a reading repetition frequency between 1 Hz and 100 Hz, preferably between 5 Hz and 20 Hz. Hence, currents are fed to the switches only if needed. Hence, an average power consumption of the control circuit can be reduced.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENTS

Hereafter, embodiments of the invention are described with reference to the accompanying drawings.

Figure 1:
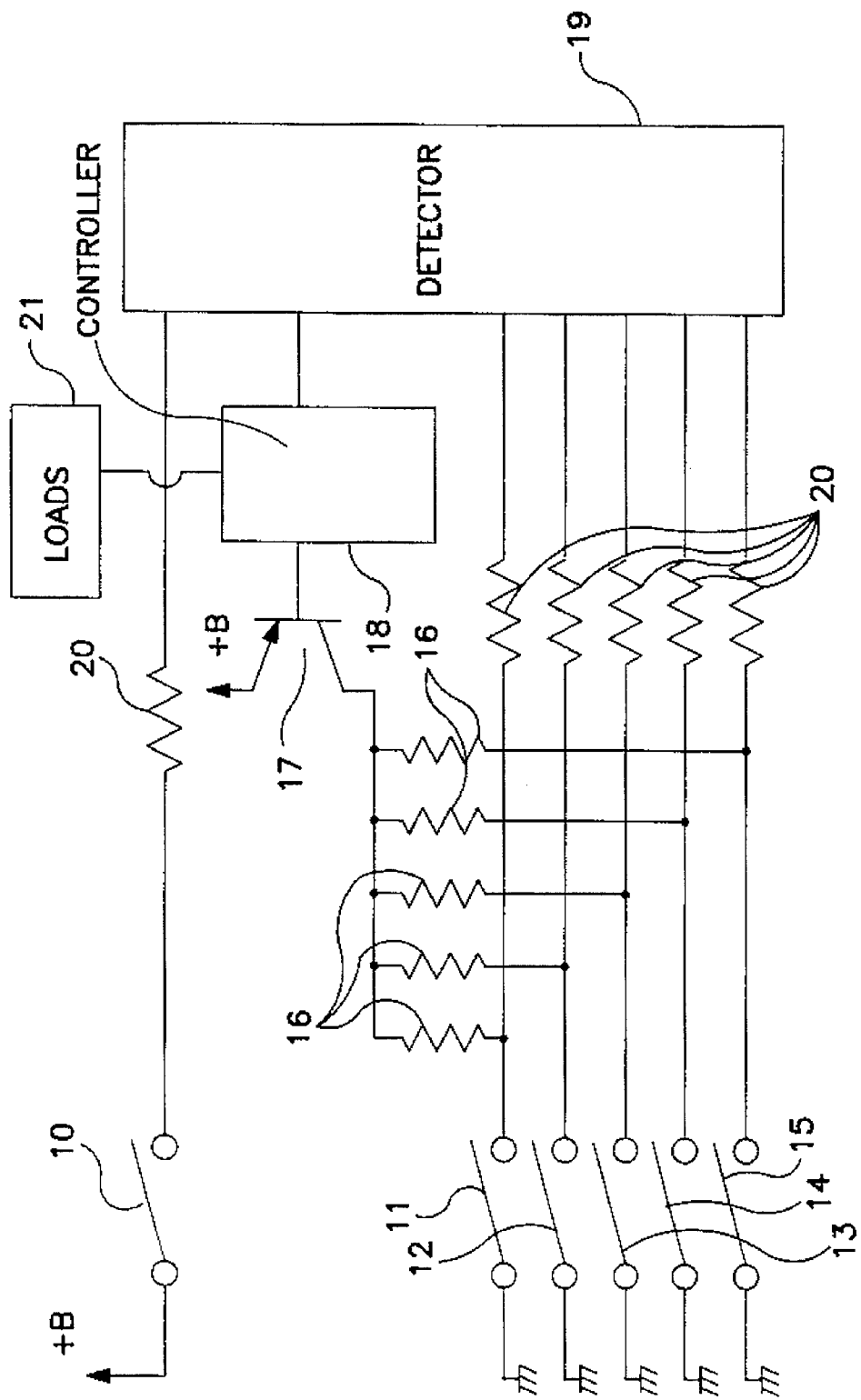
FIG. 1 is a circuit diagram of a first embodiment of an electric current control circuit for switches according to the invention.

FIG. 1 shows a first embodiment in which the invention is applied to a device for controlling a warning buzzer and a door lock of an automotive vehicle.

This controlling device is constructed as shown in FIG. 1. One terminal of an ignition switch or start switch 10 is connected with a battery (B+) and the other terminal thereof is connected with a detector 19 via a resistor 20, such that the state of the ignition switch 10 can be detected by the detector 19. Further, one terminal of each of a door open switch 11, an ignition key switch 12, a door lock switch 13, a door lock release switch 14, and a door lock motor position detection switch 15 is grounded, and the other terminal thereof is connected with a collector of a PNP transistor which acts as a common switching device 17 via a respective input resistor 16. An emitter of the switching device 17 is connected with the battery. The other terminals of the switches 11 to 15 are also connected with the detector 19 via the respective resistors 20 such that the states of the switches 11 to 15 can be detected by the detector 19. A controller 18 is connected with the detector 19, a base of the switching device 17, and loads 21 including a warning buzzer and a door lock motor. The controller 18 turns the switching device 17 on and off, and controls the operation of the loads 21 suitably in accordance with an output signal of the detector 19.

Hereafter, the operation of this embodiment is described.

In a normal state, for example, the detector 19 detects the states of the ignition switch 10, the door open switch 11 and the ignition key switch 12. When the ignition switch 10 is off, the door open switch 11 is on (the door is open), and the ignition key switch 12 is on (the ignition key is left in the key hole), the controller 18 operates the warning buzzer as one of the loads 21, thereby notifying a driver that the ignition key is left in the key hole.

The detector 19 also detects the states of the door lock switch 13, the door lock release switch 14 and the door lock motor position detection switch 15. When the door lock switch 13 is on and the door lock motor position detection switch 15 is on (the door is unlocked), or when the door lock release switch 14 is on and the door lock motor position detection switch 15 is off (the door is locked), the controller 18 operates a door lock motor as one of the loads 21 to lock or unlock the door.

Figure 2:
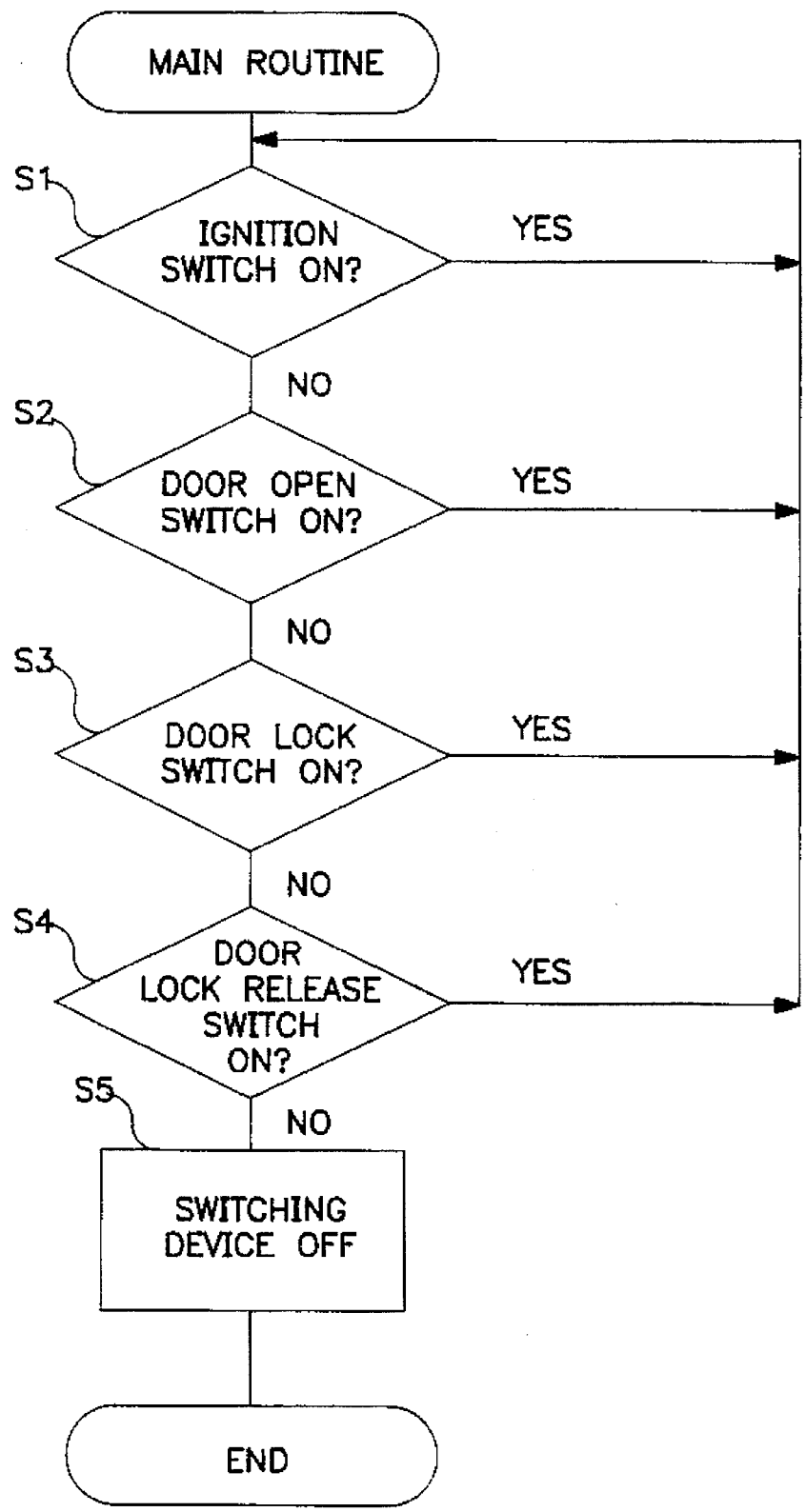
FIG. 2 is a flow chart showing the operation of the first embodiment.

The processing as shown in FIG. 2 is implemented in the controller 18 for the case that the vehicle is being parked.

Specifically, it is discriminated whether or not the ignition switch 10 is on (Step S1). The discrimination of Step S1 is made again if the ignition switch 10 is on, whereas it is discriminated whether or not the door open switch 11 is on (Step S2) if the ignition switch 10 is off. The discrimination of Step S1 is made again if the door open switch 11 is on, whereas it is discriminated whether or not the door lock switch 13 is on (Step S3) if the door open switch 11 is off. The discrimination of Step S1 is made again if the door lock switch 13 is on, whereas it is discriminated whether or not the door lock release switch 14 is on (Step S4) if the door lock switch 13 is off. The discrimination of Step S1 is made again if the door lock release switch 14 is on, whereas the controller 18 turns the switching device 17 off (Step S5) if the door lock release switch 14 is off. In other words, it is detected in Steps S1 to S4 whether the vehicle is being parked. In this way, the flow of dark current from the battery into the respective switches 11 to 15 can be prevented.

Figure 4:
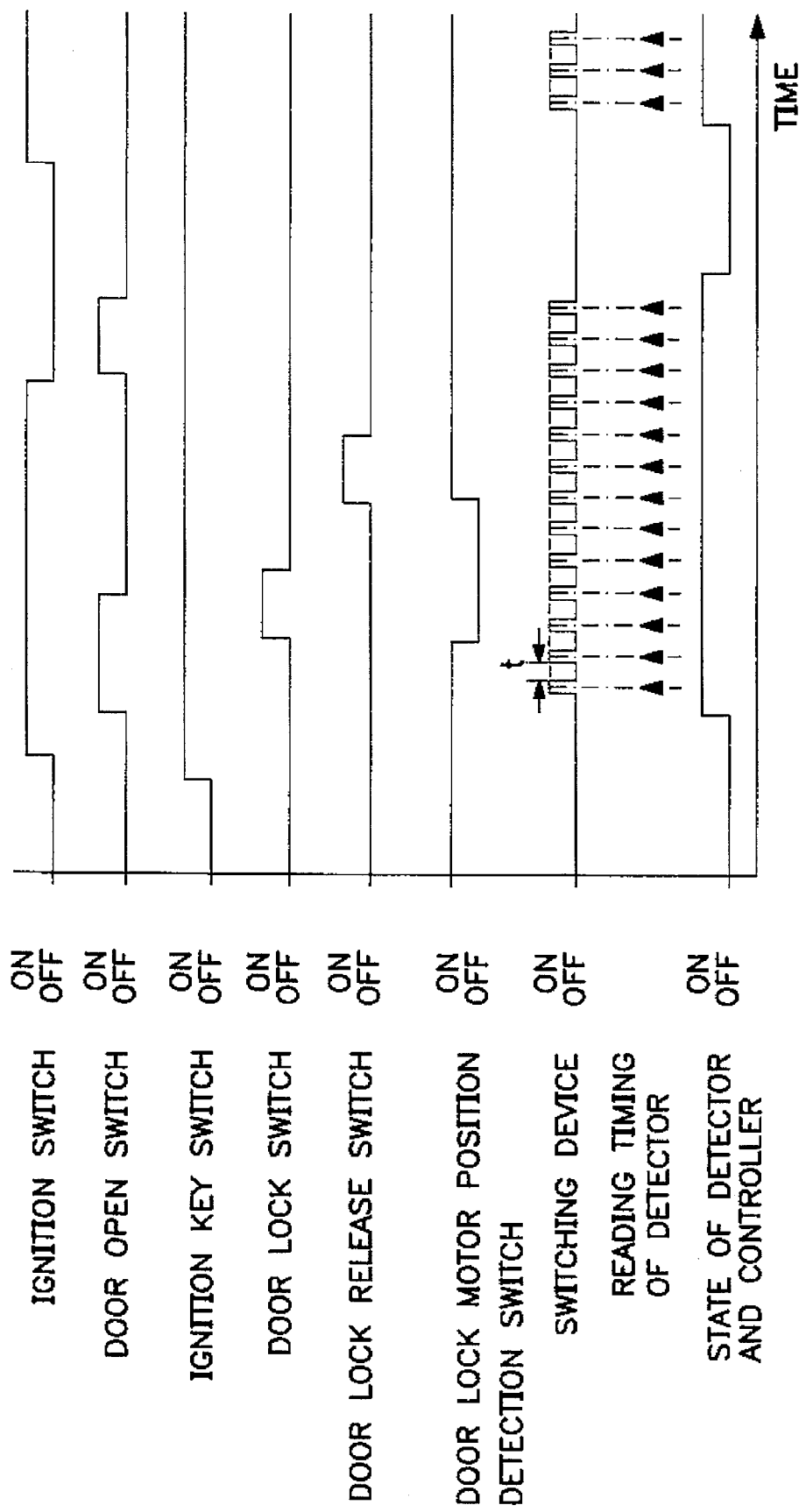
FIG. 4 is a timing chart showing the invention.
Figure 5:
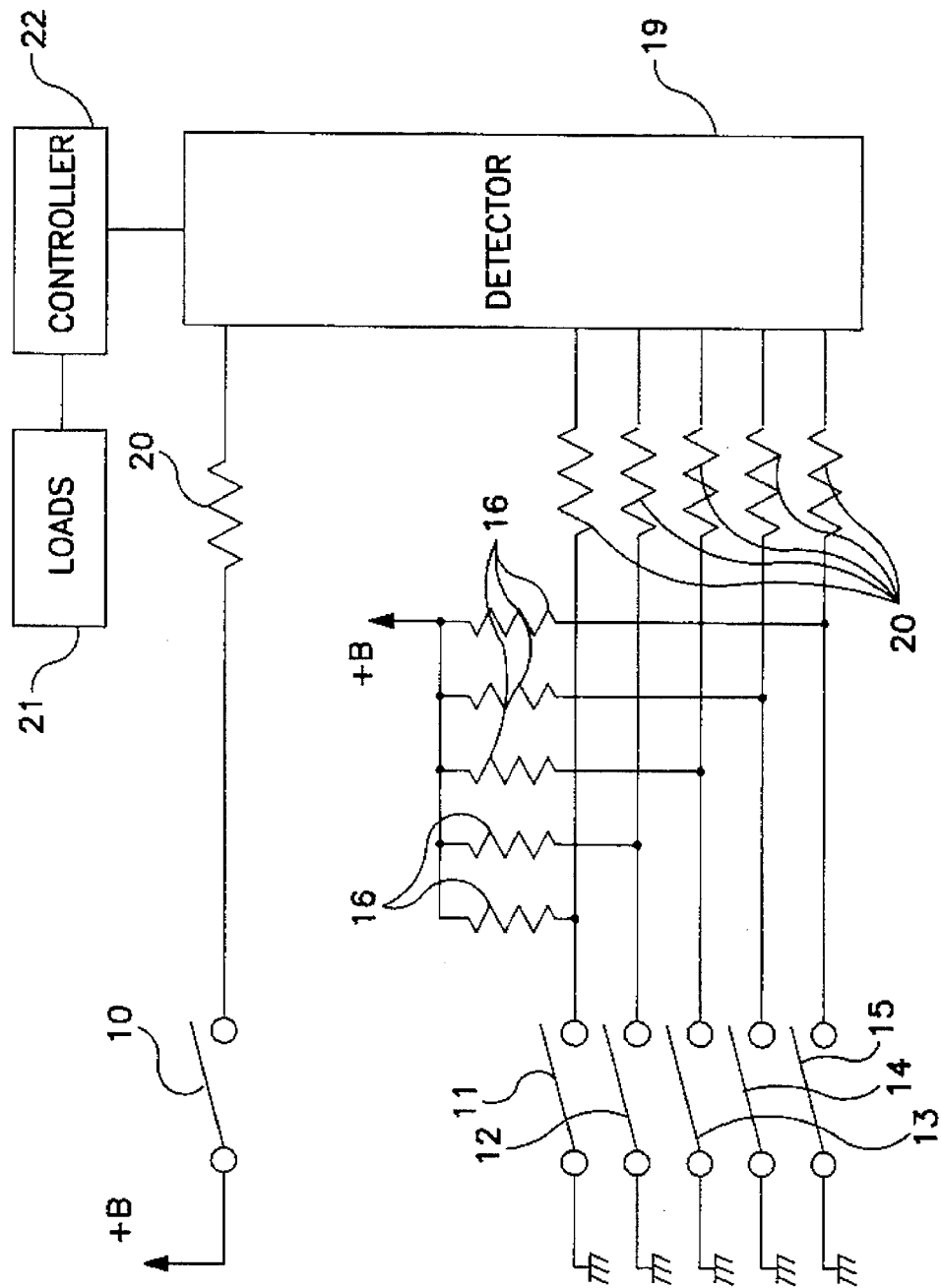
FIG. 5 is a circuit diagram of a prior art electric current control circuit for switches.

The above operations can be illustrated as shown in FIG. 4 in which a dotted line represents the ON-state of the switching device 17.

If the door open switch 11, the door lock switch 13 and the door lock release switch 14 are off after the ignition switch 10 was turned off when a driver parks his automotive vehicle, the controller 18 turns the switching device 17 off even if the ignition key is left in the key hole, i.e., the ignition key switch 12 is on, or even if the door is unlocked, i.e., the door lock motor position detection switch 15 is on. The flow of dark current into the switches 11 to 15 is thus controlled, preventing the battery from dying.

Although the invention is applied to the door open switch 11, the ignition key switch 12, the door lock switch 13, the door lock release switch 14 and the door lock motor position detection switch 15 in the first embodiment, it can be applied to other types of switches.

In the thus constructed electric current control circuit for switches, upon judging based on the states of the switches 10 to 15 detected by the detector 19 that the vehicle is being parked, the controller 18 turns the switching device 17 off, thereby perfectly cutting off the flow of current into the switches 11 to 15. Further, since fewer input resistors are used than in the art disclosed in Japanese Unexamined Patent Publication No. 4-152795, the construction of the electric current control circuit can be simplified. Thus, the control circuit takes up a smaller space on the printed circuit board and costs for parts can be reduced.

In the first embodiment, when the detector 19 detects the states of the switches 10 to 15 when the vehicle is not being parked, the detector 19 may read the detection signal at specified intervals and turn the switching device 17 on only at the reading timing of the detection signal to permit currents to flow into the switches 11 to 15 as indicated by a solid line in FIG. 4.

Figure 3:
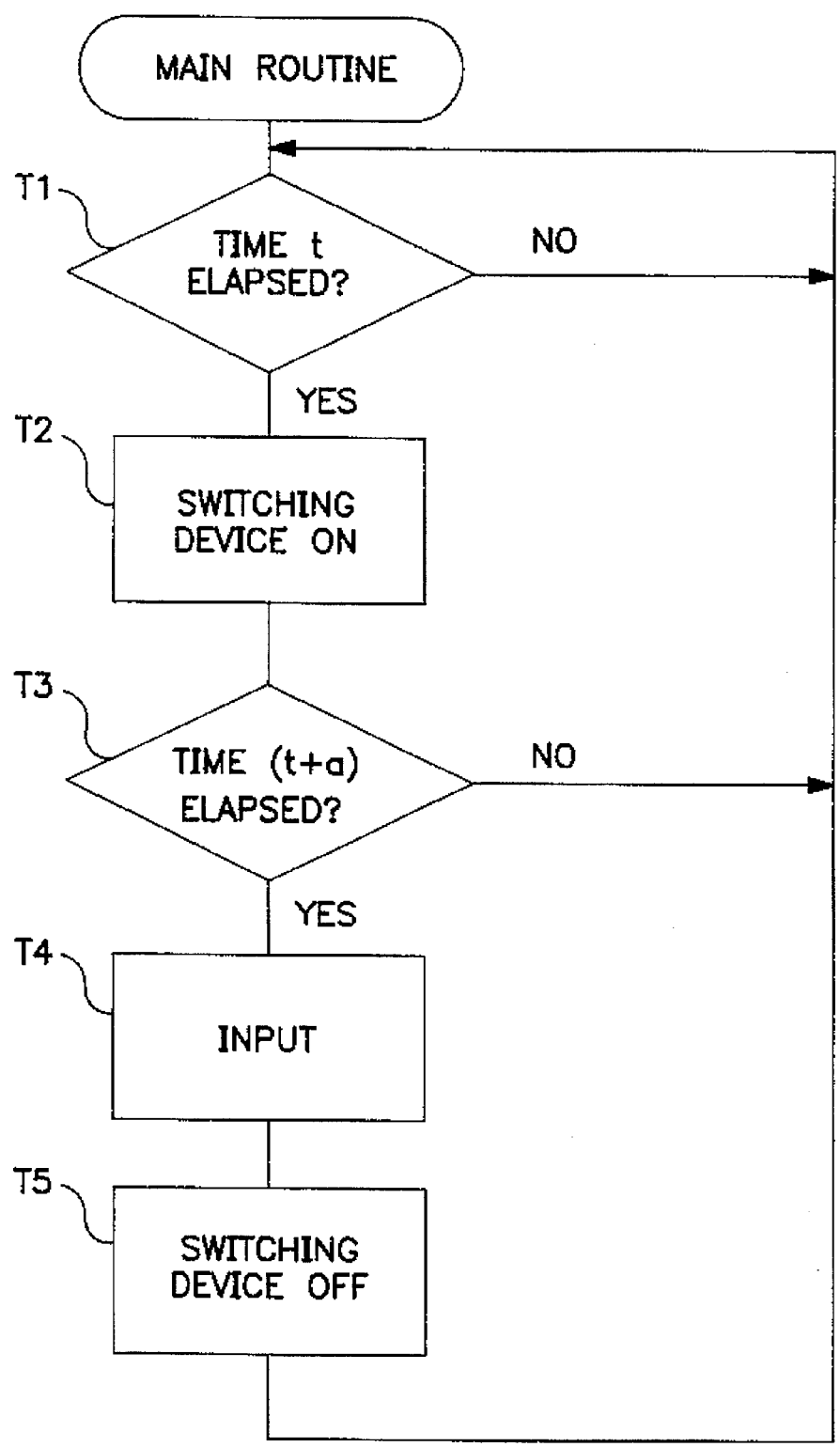
FIG. 3 is a flow chart showing the operation of a second embodiment.

More specifically, as shown in FIG. 3, it is discriminated whether or not a period t (t denotes an interval during which the detector 19 reads the detection signal) has elapsed after the switching device 17 was turned off (Step T1). If the period t has not yet elapsed, the discrimination of Step T1 is made again. If the period t has already elapsed, the switching device 17 is turned on (Step T2) to permit currents to flow into the switching circuits. It is then discriminated whether or not a period (t+α) (α denotes a waiting period for stabilizing a voltage used for the detector 19 to read the detecting signal) has elapsed after the switching device 17 was turned off (Step T3). If the period (t+α) has not yet elapsed, the discrimination of Step T1 is made again. If the period (t+α) has elapsed, the states of the respective switches are detected by the detector 19 based on the voltages of the currents flowing into the switching circuits and are input (Step T4). Thereafter, the switching device 17 is turned off (Step T5), and Step T1 follows to repeat the above operations.

According to the second embodiment, since currents are supplied to the switching circuits at the detection timing of the detector 19 only, an average power consumption of each input resistor 16 can be reduced. This enables the selection of resistors having a low rated power, thereby realizing a reduction in costs for parts.

As described above, when it is judged based on the states of the respective switches detected by the detector means that the automotive vehicle is being parked, the flow of currents into the switching circuits can perfectly be cut off and the number of the input resistors can be reduced.

Preferably, the detector means conducts a detection at specified intervals. If the switching device is turned on only at the detection timing to permit the flow of currents into the switching circuits, an average power consumption of each input resistor can be reduced so that input resistors having a low rated power can be used.

What is claimed is:

1. An electric current control circuit for automotive vehicles having a plurality of switching circuits each comprising a switch, said circuit controlling the cutting off of all current flow to the switching circuits, comprising:

a common switching device connected with the respective switching circuits so as to switch on and off an electric current flowing into each switching circuit to indicate the state of the switch thereof, detector means connected to the switching circuits' switches for detecting the on and off states thereof and for producing indicative outputs while detecting the states, and controller means having an input connected with the detector means for receiving said indicative outputs and having an output connected with the common switching device for controlling the common switching device in accordance with said indicative outputs from the detector means and switching off said common switching device to cut off all current flow to the switching circuits when a selected combination of switches of said switching circuits is detected to be in the off state.

2. A control circuit according to claim 1, further comprising an ignition start switch provided in the ignition system of the automotive vehicle, said ignition start switch being connected with the detector means (19) for detecting the state of said ignition start switch.

3. A control circuit according to claim 2, wherein said switches in said switching circuits respectively comprise a door open indicating switch, an ignition key switch, a door lock on indicating switch, a door lock release on indicating switch, and a door lock motor position detection switch, and wherein the common switching device is switched off cutting off all current to the switching circuits when the vehicle is being parked as indicated by the combination of at least said ignition switch, said door open indicating switch, said door lock on indicating switch, and said door lock release on indicating switch, all being in the off state.

4. A control circuit according to claim 2, wherein the controller means cuts off all current flow to the switching circuits when the ignition start switch is detected to be in the ON state.

5. A control circuit according to claim 1, wherein the common switching device is connected with a power supply means for supplying electric current to the plurality of switching circuits when the common switching device is switched on.

6. A control circuit according to claim 5, wherein the controller means causes the detector means to perform detection reading of the states of the switches at specified intervals during which the common switching device is caused to switch on, and wherein the common switching device is caused to switch off while the detector means does not perform the detection reading so as to cut off the flow of electric current from the power supply into the respective switches when no detection reading is being performed.

7. A control circuit according to claim 6, wherein the detector means is provided with specified times for a detection reading at intervals of 5 msec. or less, preferably less than 1 msec. and, accordingly, the common switching device is periodically switched on for 5 msec. or less, preferably less than 1 msec.

8. A control circuit according to claim 1, wherein the controller means causes the detector means to perform the detection of the states of the switches at specified intervals during which the common switching device is caused to be switched on, and wherein the controller means causes the common switching device to be switched off while the detector means does not perform the detection so as to cut off the flow of electric current into the respective switches when no detection is being performed.

9. A control circuit according to claim 8, wherein the controller means causes the detector means to perform the detection of the states at a speed of 5 msec. or less, preferably less than 1 msec., and causes the common switching device to correspondingly switch on for 5 msec. or less, preferably less than 1 msec.

10. A control circuit according to claim 9, wherein the controller means causes the detector means to perform the detection of the states at a repetition frequency between 1 Hz and 100 Hz, preferably between 5 Hz and 20 Hz.

11. A control circuit according to claim 1, wherein each of the switching circuits comprises an input resistor connected between the switch and the detector means.

12. A control circuit according to claim 11, wherein each of the switching circuits comprises another input resistor connected between the switch and the common switching device.

13. A control circuit according to claim 1, wherein the common switching device comprises a switching transistor the base of which is connected with the controller means.

14. A control circuit according to claim 1, wherein the detector means performs detection reading of the states of the switches at specified times and the controller means causes the common switching device to be only switched on during the detection reading of the detector means.

15. A control circuit according to claim 1, wherein the detector means performs detection reading of the states of the switches with a detection reading repetition frequency between 1 Hz and 100 Hz, preferably between 5 Hz and 20 Hz.

16. A control circuit according to claim 1, wherein the controller means causes the common switching device to only be switched on during the performing of the detection by the detector means.

17. Apparatus for cutting off all current flow to a set of operating switches in an automotive vehicle when the vehicle is parked, comprising:

a plurality of switching circuits each comprising a respective switch of said set;

a common switching device connected with the respective switching circuits so as to switch on and off an electric current flowing into each switching circuit to indicate the ON and OFF state of the switch thereof;

detector means connected to the switches for detecting the ON and OFF states thereof and for producing respective indicative signals of said states; and controller means having a connection to said detector means for receiving said state indicative signals and a connection with the common switching device for controlling the common switching device in accordance with said state indicative signals to cut off all current flow to the switching circuits when a selected combination of switches of said switching circuits is indicated to be in the OFF state.

18. Apparatus according to claim 17, wherein said switches in said switching circuits comprise:

an ignition start switch in the ignition system of the automotive vehicle and a door open indicating switch, an ignition key switch, a door lock on indicating switch, a door lock release on indicating switch, and a door lock motor position detection switch; and said selected combination comprises at least said ignition switch, said door open indicating switch, said door lock on indicating switch, and said door lock release on indicating switch.

19. A method for cutting off all electric current flow to a set of switching circuits in an automotive vehicle having a plurality of switching circuits each comprising a switch, a common switching device connected with the respective switching circuits so as to switch on and off an electric current flowing into each switching circuit to indicate the state of the switch thereof, and a detector system connected to the switches for detecting the ON and OFF states thereof and producing indicative signals of the states, comprising the steps of:

providing said state indicative signals to a controller;

outputting signals from said controller to said common switching device in accordance with said state indicative signals; and causing said common switching device to switch off all current flow to the switching circuits when a selected combination of switches of said switching circuits is indicated to be in the OFF state by said state indicative signals.

20. A method according to claim 19, wherein an ignition start switch is provided in the ignition system of the automotive vehicle and connected with the detector system for detecting the state thereof and said switches in said switching circuits comprise a door open indicating switch, an ignition key switch, a door lock on indicating switch, a door lock release on indicating switch, and a door lock motor position detection switch, and wherein the common switching device is caused to switch off when the vehicle is being parked as indicated by the combination of at least said ignition switch, said door open indicating switch, said door lock on indicating switch, and said door lock release on indicating switch, all being indicated as in the OFF state.

* * * * *